Figure 1:
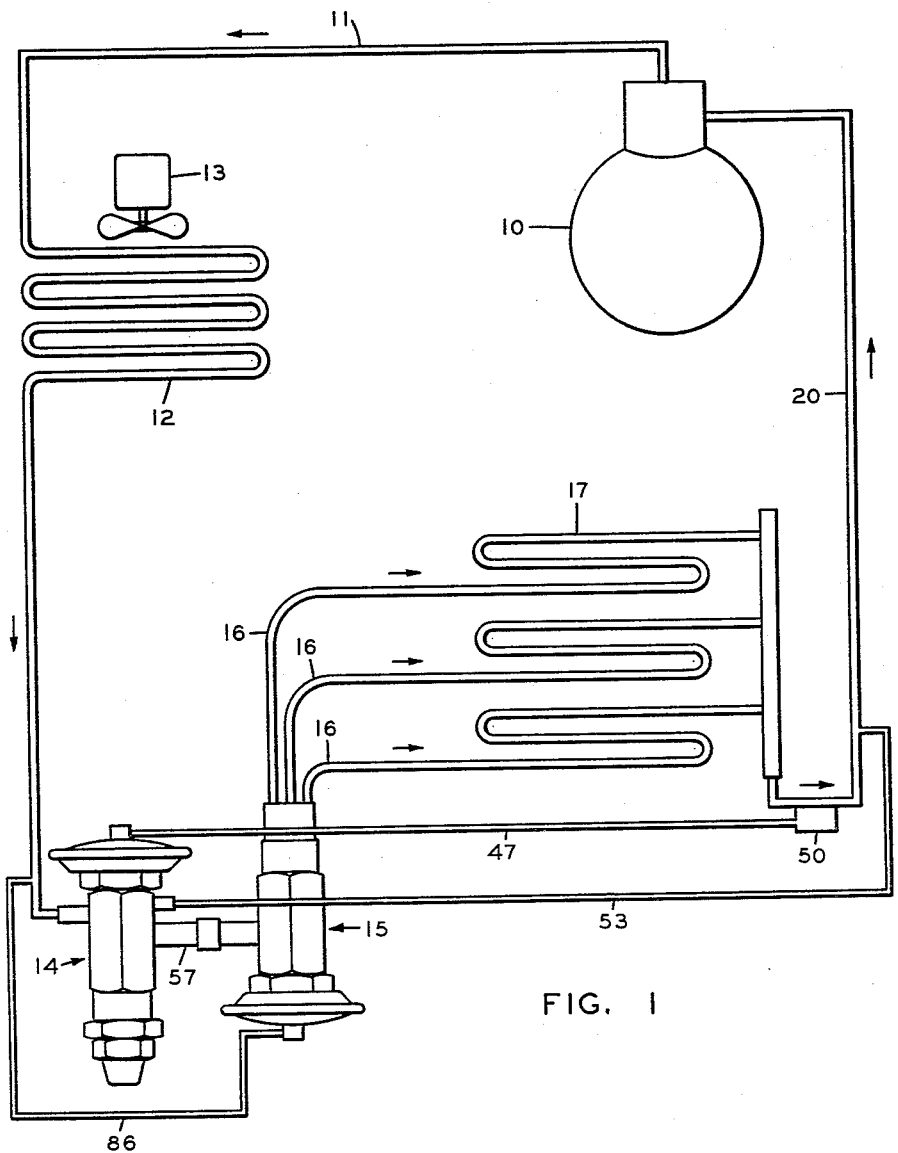

INVENTOR.
HAROLD T. LANGE

INVENTOR.
HAROLD T. LANGE

# United States Patent Office 2,960,845
Patented Nov. 22, 1960

2,960,845

REFRIGERANT CONTROL FOR SYSTEMS WITH VARIABLE HEAD PRESSURE

Harold T. Lange, Huntleigh Village, Mo., assignor to Sperlan Valve Company, St. Louis, Mo., a corporation of Missouri Filed Jan. 31, 1958, Ser. No. 712,439

6 Claims. (Cl. 62—205)

This invention relates generally to improvements in a control for refrigeration system, and more particularly to an improved refrigerant control for systems with variable head pressure.

Some air-cooled refrigerating systems, with their condensers out of doors, cannot operate properly in cool weather because the head or condenser pressure drops too low to feed the expansion device adequately. Heretofore, controls of various types have been used to keep the condenser pressure up in cool weather, such as by reducing the effective condenser surface. However, a simpler and less expensive way is to utilize a large enough thermostatic expansion valve to feed the evaporator properly even under conditions of low condenser pressure. The cost is not greatly increased provided the expansion device always operates with a low pressure across the valve port. In this event, the valve port can be made larger and of less expensive material.

Most thermostatic expansion valves in air conditioning units feed the evaporator through a distributor device which requires a certain pressure across it for efficient operation. This pressure drop may increase without detrimental effects but must remain above a minimum value. This criterion is sometimes difficult to maintain since the pressure drop generally increases and decreases with the load.

Other types of refrigeration systems, particularly small ones, use no distributing device but could operate satisfactorily with a pressure drop between the expansion device and evaporator.

As stated previously, a thermostatic expansion valve as well as other types of expansion devices, will not function properly at light loads if the port is large and the pressure drop across the port is high. Therefore, if an oversized valve port is used to obtain operating capacity at low condenser pressure, improper operation will result when the condenser pressure is high unless an additional control device is used to maintain a low pressure drop across the expansion valve port.

It is an important object of the present invention to provide a control device that maintains a constant pressure drop across the expansion valve at all times at any condenser and evaporator pressure within the normal limits of operation. Other important advantages are achieved by such a control device in providing an additional pressure drop between the expansion device and the evaporator.

Another important object is achieved by the provision of a nozzle that is variable in size in an improved refrigerant distributor.

Still another important object is realized by a valve mechanism in the improved distributor which is adapted to increase the nozzle area as the condenser pressure decreases to a minimum value, whereby to allow the expansion valve to operate with the maximum pressure available, and conversely which is adapted to decrease the nozzle area as the condenser pressure increases above the minimum value to provide a higher pressure across the distributor, and thus cause the expansion valve to operate with no increase in pressure drop across the valve at the low pressure condenser condition.

In other words, the valve mechanism in the improved control device provides a means for automatically varying the nozzle area as the condenser pressure changes which maintains a constant pressure drop across the expansion valve port, provides a high pressure drop across the distributor nozzle for best distribution when pressure is available, and provides a lower pressure drop across the nozzle when the pressure is not available.

Yet another important objective is realized by the provision of a flexible motor element in the distributor which is operatively connected to the distributor valve for controlling refrigerant flow through the nozzle, of means subjecting one side of the motor element to the pressure at the expansion device outlet, and of means subjecting the other side of the motor element to the pressure at the expansion device inlet, such mechanism operating to hold the pressure drop across the expansion device substantially constant.

Other important advantages are realized by an improved control device that maintains a substantially constant pressure across the thermostatic expansion valve so that a large port may be utilized which will insure an adequate refrigerant flow at low condenser pressure, and provides a sufficient minimum pressure across the distributor.

Figure 2:
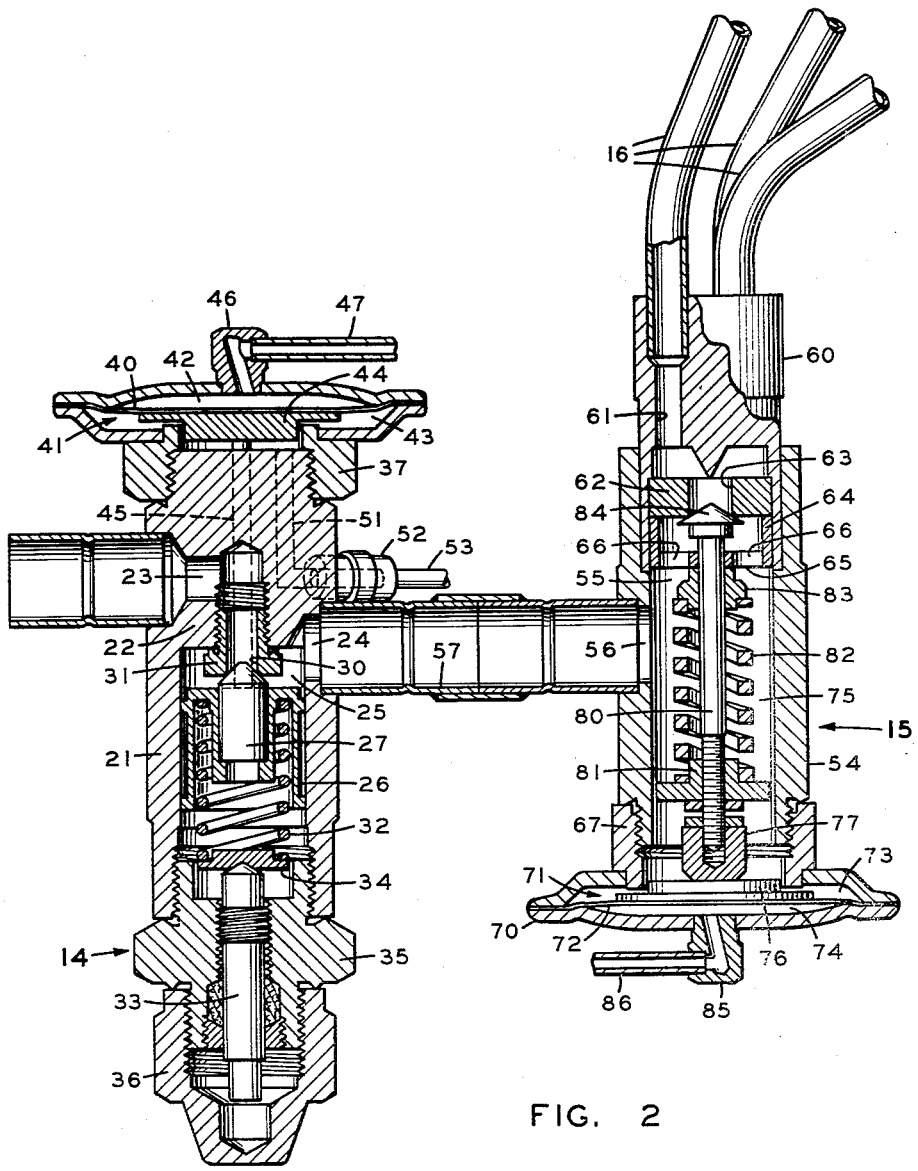

The foregoing and numerous other objects and advantages of the invention will more clearly appear from the following detailed description of a preferred embodiment, particularly when considered in connection with the accompanying drawings, in which:

Fig. 1 is a diagram of the refrigeration system utilizing the present invention, and Fig. 2 is an enlarged cross-sectional view of the thermostatic expansion valve and distributing device shown in Fig. 1.

Referring now by characters of reference to the drawings, and first to Fig. 1, there is shown a diagrammatic view of a refrigeration system utilizing the present improvements. This refrigeration system includes a compressor-electric motor unit generally referred to at 10 that delivers refrigerant by line 11 to a condenser indicated at 12. The condenser 12 is usually air-cooled as represented by the illustration of a fan and motor 13. The condenser 12 in turn delivers the refrigerant to an expansion device 14, the refrigerant thence being delivered to a distributing device 15. The refrigerant is then delivered from distributing device 15 through separate feed lines 16 to the evaporator 17. As is usual in a system of this type, the evaporator 17 is connected through a suction line 20 back to the inlet side of the compressor unit 10.

The expansion device 14 consists of a thermostatic expansion valve, the structure of which is best shown in Fig. 2.

The thermostatic expansion valve 14 includes a body 21 forming an enclosure which is in the nature of a housing, casing or barrel. A partition 22 separates a passageway formed through body 21 to provide an inlet 23 and an outlet 24. Located below partition 22 is an outlet chamber 25 which communicates with outlet 24. Located and reciprocally movable within outlet chamber 25 is a valve guide 26 that constitutes a carriage for carrying a valve 27 operable to open and close a valve seat port 30. Port 30 is formed in a replaceable threaded element 31 fastened and located in partition 22. The valve 27 and valve seat port 30 cooperate to control the flow of refrigerant between inlet 23 and outlet 24.

A compression spring 32 is located in outlet chamber 25, and is arranged to engage guide 26 so that the spring 32 acting through guide 26 tends to urge valve 27 toward a closed position.

The compressive force of spring 32 may be selectively adjusted by the manipulation of threaded stem 33, one end of which engages a movable plate 34 forming an abutment for the lower end of spring 32. Stem 33 is threadedly carried by collar 35 fastened to body 21. A cap 36 is threadedly connected to the lower end of collar 35 and serves to enclose the lower end of stem 33.

A casing structure 37 is attached to the upper end of body 21, and includes a diaphragm 40 constituting a flexible motor element located in a diaphragm chamber generally indicated at 41. The diaphragm 40 divides chamber 41 into separate compartments 42 and 43. As a reenforcing or backing for diaphragm 40 there is employed a follower plate 44. Motion of the diaphragm 40 and follower plate 44 is imparted to guide 26, and hence to valve 27 through a plurality of push rods, only one of which is shown and indicated at 45 in dotted lines.

The upper compartment 42 of diaphragm chamber 41 is connected through fitting 46 and tubing 47 to a thermal sensing bulb 50 (Fig. 1) located in thermal-responsive relation to the outlet of evaporator 17. A limited fluid charge is introduced into bulb 50, and consists preferably of a fluid having characteristics approaching or identical with those of the refrigerant employed in the system, and will usually consist of Freon 12, Freon 22, methyl chloride or any other of the refrigerants selected for the system according to preference and field of usage. Below a predetermined temperature at the bulb 50, the charge is partly in liquid stage and partly in vapor stage, and above this temperature all the charge is in vapor stage.

The diaphragm 40 is capable of flexing action under the influence of fluid pressure changes occurring by reason of thermal effects imparted to bulb 50 in response to changes in super heat in the suction line 20. Motion of the diaphragm 40 and follower plate 44 is imparted to rod 45 and hence imparted to valve 27 through guide 26. It will be apparent that downward or opening valve movement is opposed by the action of valve spring 32.

The foregoing description of the expansion valve 14 is introduced for completeness, the structure as shown and described being substantially that of a unit of this type sold by Sporlan Valve Company of St. Louis, Missouri. The valve 14 further includes a portion of a so-called equalizer passage. The equalizer passage includes a bore 51 extending into chamber 43 below diaphragm 40, the bore 51 being continued outwardly of the body of the valve and connected by fitting 52 to tubing 53 communicating with the outlet end of evaporator 17. It will thus appear that the chamber 43 is subject at all times to pressure conditions existing at evaporator outlet, which pressure tends to act in conjunction with spring 32, and tends to bias valve 27 toward a closed position against its seat 30.

The distributing device 15 includes a body structure 54 having a passage 55 therethrough. The inlet 56 of passage 55 is placed operatively in communication with the outlet 24 of expansion valve 14. As illustrated, the expansion valve outlet 24 and distributing device inlet 56 are connected by tubing 57.

Providing a closure for one end of distributor body 54 is a plug 60 having three outlets 61 communicating with the distributor passage 55. The feeding lines 16 are attached to the end of plug 60, each line 16 being placed in communication with one of the outlets 61.

A partition 62 is fastened to the interior of plug 60 across the passage 55 between inlet 56 and outlet 61. The partition 62 is provided with a valve port 63 constituting a nozzle through which the refrigerant flows.

A guide member 64 seats against one side of the partition 62, the guide member 64 having an end wall 65 provided with a plurality of apertures 66 through which the refrigerant flows to the distributor valve port 63.

The other end of distributor body 54 is provided with a threadedly connected collar 67 which carries a housing structure 70 that provides a pressure chamber 71. A flexible diaphragm 72 constituting a flexible motor element divides the chamber 71 into separate compartments 73 and 74. The distributor body 54 is provided with a chamber 75 at one side of partition 62 which is in communication with the inlet 56 and with compartment 73 at one side of diaphragm 72. It is seen that compartment 73 is subjected to the expansion device outlet pressure.

A buffer plate 76 is attached to diaphragm 72, the buffer plate 76 engaging an end cap 77 threadedly attached to one end of valve stem 80. Also threadedly attached to valve stem 80 is a collar 81 which serves to guide the valve stem in its reciprocal movement in chamber 75. A compression spring 82 is located in chamber 75 about valve stem 80, one end of spring 82 engaging the guide member 81 and the other end engaging a shoulder member 83 slidably fitted on valve stem 80. The spring 82 tends to urge shoulder member 83 against the end wall 65 of guide member 64. The valve stem 80 is slidably mounted in the end wall 65 of guide member 64, and includes a tapered valve head 84 adapted to open and close the valve port 63, and hence control the flow of refrigerant through port 63.

The housing 70 is provided with a fitting 85 connected to a tubing 86 placed in communication with compartment 74 at the other side of diaphragm 72. The tubing 86 is connected operatively to the refrigerant line ahead of the expansion device 14, thus placing compartment 74 and the corresponding one side of diaphragm 72 in responsive relation to the condenser pressure at the expansion device inlet 23.

It is apparent that the compression spring 82 tends to urge the valve stem 80 in a direction to open the distributor valve port 63, and tends to urge the valve stem 80 against the buffer plate 76 and the side of diaphragm 72 subjected to the expansion device outlet pressure. Thus the spring 82 and the expansion device outlet pressure balance the condenser or expansion device inlet pressure, and will therefore, hold the differential between expansion device inlet and outlet substantially constant, the amount of this pressure differential depending on the compressive force of the spring as well as the effective area of the diaphragm 72.

Given below is a table showing the range of pressures possible in the condenser 12 from summer to winter as well as the expected range of evaporator pressure. Under these conditions, the table shows the pressures at expansion valve inlet and outlet, and the pressures at the inlet and outlet of the distributing control device 15. This table is based upon the refrigeration system utilizing Freon 12. Other refrigerants would vary in proportion.

*Table*

|  | lbs/sq. in maximum | lbs/sq. in minimum |
|---|---|---|
| Condenser Pressure | 150 | 55 |
| Pressure Across Expansion Device | 20 | 20 |
| Expansion Device Outlet Pressure | 130 | 35 |
| Pressure Across Distributor | 80 | 10 |
| Evaporator Pressure | 50 | 25 |

It is seen from this table that the distributing control device maintains a substantially constant pressure across the thermostatic expansion valve at all times at any condenser pressure within normal limits of operation. As explained previously, the control device enables the utilization of a large valve port in the expansion valve 14 which will insure sufficient refrigerant flow at low condenser pressure, and assure a sufficient minimum pressure across the distributing device 15.

For example, as the condenser pressure decreases, the distributor diaphragm 72 is subjected to a correspondingly decreased pressure at one side through the connection of tubing 86, thus allowing the distributor valve 84 to increase the area of distributor valve port 63. This action allows the distributing device 15 to operate with a lower pressure drop and allows the expansion valve 14 to operate with the maximum pressure available.

Conversely, the distributor valve port 63 will be decreased in size when the condenser pressure is high to provide a high pressure drop across the distributor device 15 and hence enables the expansion valve 14 to operate with no increase in pressure drop above the low pressure condition previously described.

With the structural arrangement described and discussed previously, it is seen that by varying the distributor valve port size as the condenser pressure varies, a control is provided which maintains a constant pressure across the expansion valve port 30, provides a high pressure drop across the distributor valve port 63 for best distribution when pressure is available, and provides a low pressure drop across the distributor valve port 63 when pressure is not available. By a proper proportion of the parts and pre-setting of the control pressure, efficient operation can be obtained.

Although the invention has been described by making detailed reference to a single preferred embodiment, such detail is to be understood in an instructive, rather than in any restrictive sense, many variants being possible within the scope of the claims hereunto appended.

I claim as my invention:

1. In a refrigeration system of compressor-condenser-evaporator type, an expansion device connected in the refrigerant line between the condenser and evaporator, said expansion device including a valve means for controlling flow therethrough, a distributing device connected in the refrigerant line between the expansion device and evaporator, said distributing device including a variable nozzle controlling flow therethrough, the flow being through the expansion device valve means and the distributing device nozzle, and motor means connected to said nozzle and operatively subjected in opposed relation to pressures at the expansion device inlet and outlet for operating said nozzle so as to increase and decrease the opening of the distributing device nozzle respectively upon a decrease and an increase in expansion device inlet pressure.

2. In a refrigeration system of compressor-condenser-evaporator type, an expansion device having its inlet connected to the condenser, the expansion device including a valve means for controlling flow therethrough, a distributing device having its inlet connected to the outlet of the expansion device and having its outlet connected to said evaporator, the distributing device including a valve port between its inlet and outlet, a valve element for controlling flow through said port, the flow being through the expansion device valve means and the said distributing device valve port, motor means connected to said valve element for controlling movement, and means placing the motor means in responsive opposed relation to the pressures at the expansion device inlet and outlet so as to increase and decrease the opening of the distributing device port respectively upon a decrease and an increase in expansion device inlet pressure.

3. In a refrigeration system of compressor-condenser-evaporator type, an expansion device provided with a passageway having an outlet and an inlet, the inlet connected to the condenser, a valve means in said passageway for controlling flow therethrough, a distributing device having its inlet connected to the outlet of the expansion device, and having its outlet connected to said evaporator, the distributing device including a body having a passage therethrough, the passage having a valve port, a valve element for controlling flow through said port, the flow being through the expansion device valve means and the distributing device valve port, a flexible motor element operatively connected to said valve element, means subjecting one side of the flexible motor element to pressure at the expansion device inlet, and means subjecting the other side of the flexible motor element to pressure at the expansion device outlet so as to increase and decrease the opening of the distributing device valve port respectively upon a decrease and an increase in expansion device inlet pressure.

4. In a refrigeration system of compressor-condenser-evaporator type, an expansion device having its inlet connected to the condenser, a distributing device having its inlet connected to the outlet of the expansion device and having its outlet connected to said evaporator, the distributing device including a body having a passage therethrough, the passage having a valve port, the body having a chamber communicating with said passage inlet at one side of the valve port, a valve element disposed in said chamber for controlling flow through said port, a flexible motor element in said body, a valve stem extending from one side of said flexible motor element through said chamber and interconnecting the motor element with said valve element, means placing the said one side of the flexible motor element from which the valve stem extends in communication with the said chamber for subjecting the said motor element side to the expansion device outlet pressure, and a tubing operatively interconnecting the expansion device inlet to the other side of the flexible motor element for subjecting the said other side to the expansion device inlet pressure so as to increase and decrease the opening of the valve port respectively upon a decrease and an increase in expansion device inlet pressure.

5. The combination and arrangement of elements as recited above in claim 4, but further characterized by the provision of a compression spring located in the chamber and operatively connected to said valve stem tending to urge the valve element in a valve-open position and tending to exert a force on the motor element side subjected to the expansion device outlet pressure and in opposition to the expansion device inlet pressure.

6. In a refrigeration system of compressor-condenser-evaporator type, a thermostatic expansion valve including a body having a passage therethrough, the passage having an outlet and having an inlet connected to the condenser, and having a valve port, a valve element for controlling flow of refrigerant through said port, a motor element connected to said valve element, means subjecting one side of said motor element to a pressure responsive to thermal conditions at evaporator outlet, means subjecting the other side of the motor element to evaporator outlet pressure, a distributing device connected in the refrigerant line between the expansion valve outlet and the evaporator, said distributing device including a variable nozzle, the flow being through said expansion device valve port and through said distributing device nozzle, a motor means connected to said nozzle for controlling the opening, and means placing the distributing device motor means in opposed responsive relation to the pressures at the expansion valve inlet and outlet so as to increase and decrease the nozzle opening respectively upon a decrease and an increase in expansion device inlet pressure.

References Cited in the file of this patent

UNITED STATES PATENTS

| 2,409,661 | Carter | Oct. 22, 1946 |
| 2,547,070 | Aughey | Apr. 3, 1951 |
| 2,614,393 | Schulz | Oct. 21, 1952 |
| 2,665,972 | Ray | Jan. 5, 1954 |